United States Patent
Huang

(10) Patent No.: US 9,264,314 B2
(45) Date of Patent: Feb. 16, 2016

(54) METHOD, SYSTEM, AND SWITCH FOR MAKING BRIDGE IN MSTP JOIN REGION

(71) Applicant: Huawei Technologies Co., Ltd., Shenzhen (CN)

(72) Inventor: Jianbing Huang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 14/175,245

(22) Filed: Feb. 7, 2014

(65) Prior Publication Data

US 2014/0153445 A1 Jun. 5, 2014

Related U.S. Application Data

(63) Continuation of application No. PCT/CN2012/073477, filed on Apr. 1, 2012.

(30) Foreign Application Priority Data

Aug. 9, 2011 (CN) .......................... 2011 1 0226870

(51) Int. Cl.
*H04L 12/24* (2006.01)
*H04L 12/753* (2013.01)
*H04L 12/46* (2006.01)
*H04L 12/705* (2013.01)

(52) U.S. Cl.
CPC ............. *H04L 41/12* (2013.01); *H04L 12/462* (2013.01); *H04L 45/18* (2013.01); *H04L 45/48* (2013.01)

(58) Field of Classification Search
None
See application file for complete search history.

(56) References Cited

U.S. PATENT DOCUMENTS

| 7,480,258 B1 * | 1/2009 | Shuen ..................... H04L 45/00 370/217 |
| 7,701,881 B1 * | 4/2010 | Sankaran ....................... 370/256 |
| 7,760,668 B1 | 7/2010 | Zinjuvadia |
| 7,821,972 B1 * | 10/2010 | Finn ........................ H04L 45/00 370/256 |
| 8,467,316 B1 * | 6/2013 | Goli .................... H04L 12/4625 370/254 |

(Continued)

FOREIGN PATENT DOCUMENTS

| CN | 1510873 A | 7/2004 |
| CN | 101014040 A | 8/2007 |

(Continued)

OTHER PUBLICATIONS

Foreign Communication From a Counterpart Application, European Application No. 12779660.5, Extended European Search Report dated Feb. 28, 2014, 9 pages.

(Continued)

*Primary Examiner* — Candal Elpenord
(74) *Attorney, Agent, or Firm* — Conley Rose, P.C.; Grant Rodolph

(57) ABSTRACT

A method, a system, and a switch for making a bridge in the Multiple Spanning Tree Protocol (MSTP) join a region. A root bridge in a multiple spanning tree instance (MSTI) to be generated acquires region information of the MSTP; and sends a region join packet carrying the region information of the MSTP to a downstream bridge after the region information of the MSTP is configured on the root bridge, so that the downstream bridge configures the region information of the MSTP to region information of the downstream bridge. Region information may be configured on a root bridge of the MSTP and notified to a downstream bridge, so that all bridges of the MSTP join a region in which the root bridge resides.

8 Claims, 4 Drawing Sheets

A root bridge in an MSTI to be generated acquires region information of the MSTP — 11

The root bridge sends a region join packet to a downstream bridge after the region information of MSTP is configured on the root bridge, where the region join packet carries the region information of MSTP, so that the downstream bridge configures the region information of the MSTP to region information of the downstream bridge — 12

(56) References Cited

U.S. PATENT DOCUMENTS

| | | | |
|---|---|---|---|
| 2004/0081171 A1* | 4/2004 | Finn | H04L 12/462 370/395.53 |
| 2006/0007939 A1* | 1/2006 | Elangovan | H04L 12/465 370/395.53 |
| 2007/0140147 A1* | 6/2007 | Touve | H04L 12/4641 370/255 |
| 2007/0258390 A1 | 11/2007 | Khan et al. | |
| 2008/0089245 A1* | 4/2008 | Reichstein | H04L 12/462 370/256 |
| 2011/0064077 A1 | 3/2011 | Wen | |
| 2011/0134803 A1 | 6/2011 | Dalvi et al. | |

FOREIGN PATENT DOCUMENTS

| | | |
|---|---|---|
| CN | 101299671 A | 11/2008 |
| CN | 101640681 A | 2/2010 |
| CN | 102291300 A | 12/2011 |

OTHER PUBLICATIONS

Cisco Systems, "Understanding Multiple Spanning Tree Protocol (802.1s)," Internet Citation, XP002426379, May 14, 2005, 14 pages.

Son, M., et al., "Multiple Spanning Tree Protocols in 10 Gigabit Ethernet Edge System," Proceedings of Spie, International Society for Optical Engineering, vol. 4908, XP009042853, Jan. 1, 2002, pp. 201-210.

Ishizu, K., et al., "SSTP: An 802.1S Extension to Support Scalable Spanning Tree for Mobile Metropolitan Area Network," Global Telecommunications Conference, Globecom '04, IEEE Dallas, XP010757773, Nov. 29, 2004, pp. 1500-1504.

"IEEE Standards for Local and Metropolitan Area Networks, Virtual Bridged Local Area Networks—Amendment 3: Multiple Spanning Trees," IEEE Standards, 802.1s, Dec. 31, 2002, 222 pages.

Foreign Communication From a Counterpart Application, PCT Application No. PCT/CN2012/073477, Chinese Search Report dated Jul. 12, 2012, 7 pages.

Foreign Communication From a Counterpart Application, PCT Application No. PCT/CN2012/073477, Chinese Written Opinion dated Jul. 12, 2012, 7 pages.

Foreign Communication From a Counterpart Application, Chinese Application No. 201110226870.7, Chinese Office Action dated Feb. 14, 2014, 9 pages.

Foreign Communication From a Counterpart Application, Chinese Application No. 201110226870.7, Chinese Office Action dated Jun. 27, 2013, 8 pages.

\* cited by examiner

METHOD, SYSTEM, AND SWITCH FOR MAKING BRIDGE IN MSTP JOIN REGION

CROSS-REFERENCE TO RELATED APPLICATION

This application is a continuation of International Application No. PCT/CN2012/073477, filed on Apr. 1, 2012, which claims priority to Chinese Patent Application No. 201110226870.7, filed on Aug. 9, 2011, both of which are hereby incorporated by reference in their entireties.

TECHNICAL FIELD

The present invention relates to network communications technologies, and in particular, to a method, a system, and a switch for making a bridge in the Multiple Spanning Tree Protocol (MSTP) join a region.

BACKGROUND

The Spanning Tree Protocol (STP) achieves a function of eliminating a Layer 2 network loop by transmitting a protocol packet of a bridge protocol data unit (BPDU) between switches and completing spanning tree computation based on information included in the BPDU. When a network fault occurs, the Spanning Tree Protocol re-computes a blocking point and enables a redundant link to recover a network service. An STP network computes only one spanning tree, and all traffic of a virtual local area network (VLAN) are forwarded according to one spanning tree, making it impossible to implement load sharing.

The MSTP standard defines the concept of a region. The MSTP divides a switching network into multiple regions. Generally, switches in a geographical scope belong to a same region. In a region, instances are defined according to different service VLAN and a spanning tree is computed for each instance. Therefore, multiple spanning trees may be formed in each region and each spanning tree is called a multiple spanning tree instance (MSTI). A VLAN and an MSTI are associated by setting a VLAN mapping table. For different MSTIs, traffic of a VLAN in an instance may be forwarded according to a computed spanning tree topology, and load sharing of spanning trees in a region may be implemented through different topologies of various spanning trees.

When all bridges of a Layer 2 network in an area need to join a same region, the prior art uses a manual configuration manner in which operation personnel configures region information of the MSTP on each switch. A manual configuration solution, however, involves an issue about a large workload, difficult deployment, and high operation and maintenance costs.

SUMMARY

Embodiments of the present invention provide a method, a system, and a switch for making a bridge in the MSTP join a region, so as to solve an issue about a large workload, difficult deployment, and high operation and maintenance costs involved in manual region information configuration in the prior art.

According to one aspect, an embodiment of the present invention provides a method for making a bridge in the MSTP join a region. The method includes: acquiring, by a root bridge in a multiple spanning tree instance MSTI to be generated, region information of the MSTP; and sending, by the root bridge, a region join packet to a downstream bridge after the region information of the MSTP is configured on the root bridge, where the region join packet carries the region information of the MSTP, so that the downstream bridge configures the region information of the MSTP to region information of the downstream bridge.

According to another aspect, an embodiment of the present invention provides a method for making a bridge in the MSTP join a region. The method includes receiving, by a downstream bridge, a region join packet sent by an upstream node, where the region join packet carries region information of the MSTP; and configuring, by the downstream bridge, the region information of the MSTP to local region information.

According to still another aspect, an embodiment of the present invention provides a switch. The switch includes: an acquiring module, adapted to acquire region information of the Multiple Spanning Tree Protocol MSTP; and a sender, adapted to send a region join packet to a downstream bridge after the region information of the MSTP is configured on the switch, where the region join packet carries the region information of the MSTP, so that the downstream bridge configures the region information of the MSTP to region information of the downstream bridge.

According to a fourth aspect, an embodiment of the present invention provides a switch. The switch includes a receiver, adapted to receive a region join packet sent by an upstream node, where the region join packet carries region information of the Multiple Spanning Tree Protocol MSTP; and a configuring module, adapted to configure the region information of the MSTP to local region information.

An embodiment of the present invention provides a network system. The network system includes a root bridge, adapted to send acquired region information of the MSTP to a downstream bridge; and the downstream bridge, adapted to configure the region information of the MSTP to region information of the downstream bridge.

As can be seen from the foregoing technical solutions, in the embodiments of the present invention, a general root bridge sends a region join packet to a downstream bridge, where the region join packet carries region information, so that automatic region information configuration can be implemented and the downstream bridge automatically joins a corresponding region, thereby avoiding an issue about a large workload, difficult deployment, and high operation and maintenance costs involved in manual configuration.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
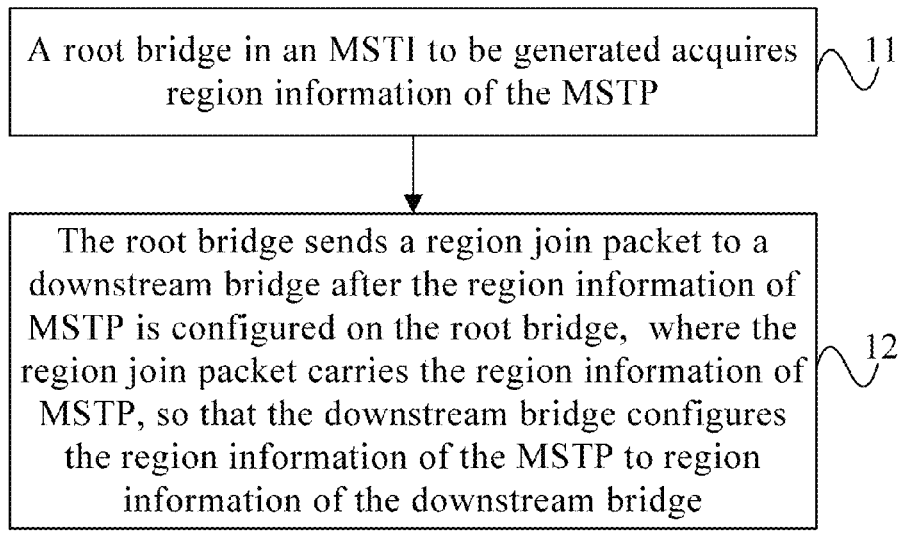
FIG. 1 is a schematic flowchart of a method according to a first embodiment of the present invention.
Figure 2:
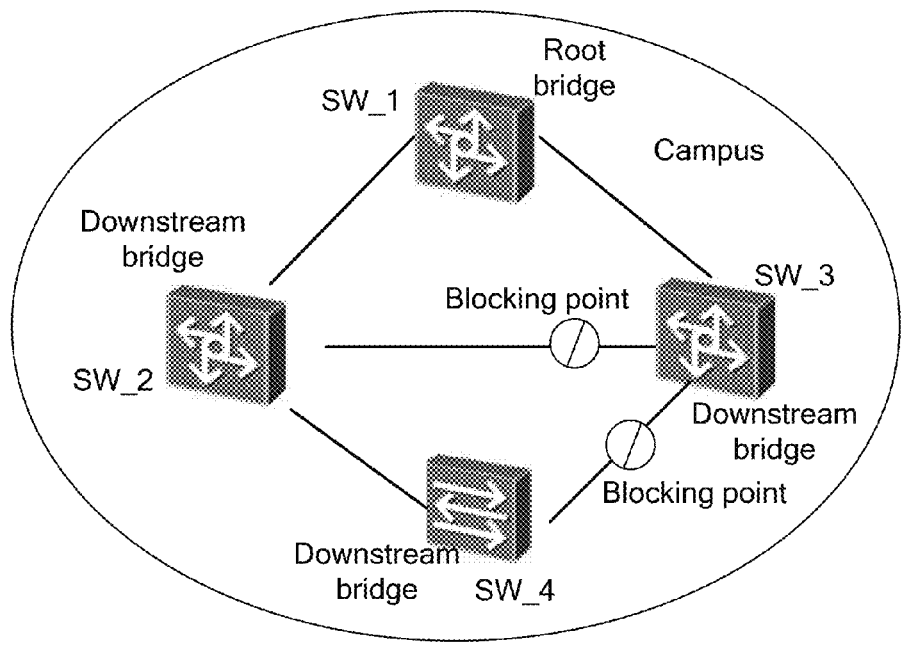
FIG. 2 is a schematic structural diagram of bridges in a region according to an embodiment of the present invention.

FIG. 1 is a schematic flowchart of a method according to a first embodiment of the present invention, and FIG. 2 is a schematic structural diagram of bridges in a region according to an embodiment of the present invention. Refer to FIG. 2. The name of the region is campus. The region includes four switches, SW_1, SW_2, SW_3, and SW_4. Corresponding to different MSTI, the switches may be classified by different roles into root bridges and downstream bridges (or called designated bridges). In this embodiment, the SW_1 is a root bridge and the other switches are downstream bridges. In the MSTP, multiple spanning trees may be generated according to different VLANs in a same region. Each spanning tree is called an MSTI, and each MSTI corresponds to one root bridge and at least one downstream bridge. A root bridge in each MSTI may be determined in a contention manner (or called an election manner). During network topology establishment, a spanning tree is generated level by level from the root bridge to downstream bridges, and a BPDU packet is delivered level by level from the root bridge to the downstream bridges.

Refer to FIG. 1. The method provided in this embodiment includes the following steps:

Step 11: A root bridge in an MSTI to be generated acquires region information of the MSTP.

A user may configure the region information of the MSTP for the root bridge by using a command line, so that the root bridge acquires the region information of the MSTP to implement configuration of the region information of the MSTP on the root bridge.

The region information of the MSTP may be indicated by REGION_CONFIG, where the REGION_CONFIG is a triplet composed of three parameters. The three parameters are a region name (REGION_NAME), an instance (REGION_INSTANCE), and a revision level (REGION_LEVEL). The region name may indicate a name of a region to be joined; the instance may indicate each instance in the region as well as a configured VLAN list corresponding to each instance; and the revision level is reserved by a standard and its default value is 0.

Taking a system shown in FIG. 2 as an example, the triplet may be shown in Table 1.

TABLE 1

| | |
|---|---|
| REGION_NAME | CAMPUS |
| REGION_INSTANCE | Instance 1: vlan 100; |
| | Instance 0: 1 to 99, 101 to 4094; |
| REGION_LEVEL | 0 |

Step 12: The root bridge sends a region join packet to a downstream bridge after the region information of the MSTP is configured on the root bridge, where the region join packet carries the region information of the MSTP, so that the downstream bridge configures the region information of the MSTP to region information of the downstream bridge.

The root bridge sends the region join packet through an MSTP port. The region join packet first reaches a downstream bridge directly connected to the root bridge, and then the downstream bridge sends the region join packet downward level by level until the region join packet reaches a last reachable downstream bridge.

For example, an SW_1 sends a region join packet to an SW_2; and the SW_2 may configure region information of the MSTP that is carried in the packet to region information of the SW_2 itself after receiving the region join packet, so that the SW_2 may join a region corresponding to the region information.

In this embodiment, a region name may also be preset on each downstream bridge. When receiving a region join packet, a downstream bridge first determines whether a region name in received region information of the MSTP is the same as a region name configured on the downstream bridge itself. If yes, the downstream bridge configures the region information of the MSTP to region information of the downstream bridge itself. If not, the downstream bridge does not perform configuration. In this embodiment, a root bridge sends a region join packet to a downstream bridge, where the region join packet carries the region information, so that automatic region information configuration can be implemented and the downstream bridge automatically joins a corresponding region, thereby avoiding an issue about a large workload, difficult deployment, and high operation and maintenance costs involved in manual configuration.

Figure 3:
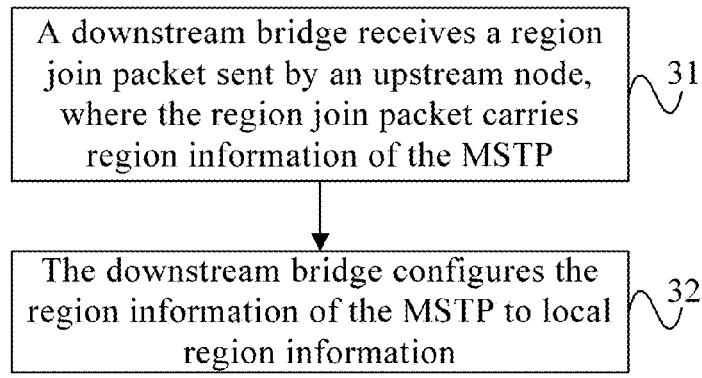
FIG. 3 is a schematic flowchart of a method according to a second embodiment of the present invention.

FIG. 3 is a schematic flowchart of a method according to a second embodiment of the present invention. The method includes the following steps:

Step 31: A downstream bridge receives a region join packet sent by an upstream node, where the region join packet carries region information of the MSTP.

For example, as shown in FIG. 2, an SW_2 receives a region join packet sent by an SW_1; or an SW_4 receives a region join packet sent by the SW_2.

The region information of the MSTP may be indicated by REGION_CONFIG, where the REGION_CONFIG is a triplet composed of three parameters. The three parameters are a region name (REGION_NAME), an instance (REGION_INSTANCE), and a revision level (REGION_LEVEL).

Step 32: The downstream bridge configures the region information of the MSTP to local region information.

For example, this may be as follows: the downstream bridge configures the region information of the MSTP to the local region information after receiving the region join packet. Alternatively, a region name is configured in advance on the downstream bridge, and after receiving the region join packet, the downstream bridge compares the region name in the region information of the MSTP with the region name configured on the downstream bridge itself to determine whether they are the same. If yes, the downstream bridge configures the region information of the MSTP to the local region information. If not, the downstream bridge does not perform configuration.

Further, if a downstream node exists for the downstream bridge, the downstream bridge continues to send the region join packet to its own downstream node till the region join packet reaches a last node in the region, where the region join packet carries the region information of the MSTP, so that the downstream node configures the region information of the MSTP to region information of the downstream node itself.

In this embodiment, a downstream bridge receives a region join packet sent by a root bridge and configures region information of the MSTP that is carried in the region join packet to local region information, so that automatic region information configuration can be implemented and the downstream bridge automatically joins a region corresponding to the region information, that is, a region in which the root bridge resides. In addition, by continuing to send the region join packet to a downstream node, all bridges that the region join packet reaches on an MSTP network can join the region in which the root bridge resides, thereby avoiding an issue about a large workload, difficult deployment, and high operation and maintenance costs involved in manual configuration.

Figure 4:
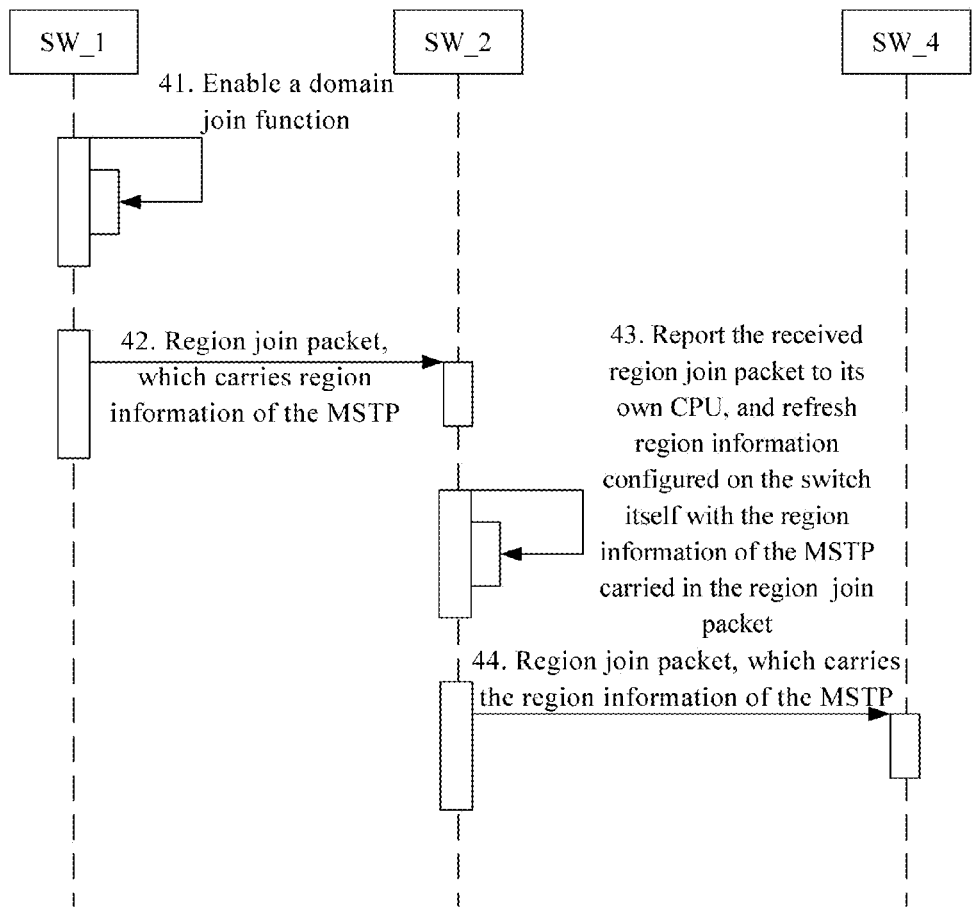
FIG. 4 is a schematic flowchart of a method according to a third embodiment of the present invention.

FIG. 4 is a schematic flowchart of a method according to a third embodiment of the present invention. The method includes the following steps:

Step 41: Enable a region join function on a root bridge (taking the SW_1 as an example).

On an MSTP network, different MSTIs are generated for different VLANs. For an MSTI to be generated, switches in a region in which the MSTI resides may determine a root bridge and a downstream bridge in a contention manner. Each switch on the MSTP network corresponds to a default region, and a corresponding region may be defined according to a geographical location in which a switch resides. For example, if a first geographical location responds to a first region, and if both a first switch and a second switch are within a scope of the first geographical location, default regions of the first switch and the second switch are the first region. Subsequently, the first switch and the second switch will exchange BPDU packets to determine a root bridge through contention after they are enabled, assuming that the region in which the MSTI to be generated resides is the first region.

A specific contention process may be as follows: each switch corresponds to a bridge identifier (ID), the bridge ID includes a priority, and when a priority in a bridge ID of a switch is the highest (corresponding to the smallest priority value), it indicates that the switch is the root bridge. Various switches exchange BPDU packets. The exchanged BPDU packets carry respective bridge IDs. A switch corresponding to a bridge ID that includes the highest priority is determined, by comparing the bridge IDs, as the root bridge. For example, as shown in FIG. 2, the root bridge is the SW_1.

After the root bridge is determined, a user may enter region information of the MSTP to the root bridge by using a command line, so as to configure the root bridge.

Step 42: The root bridge sends a region join packet to a downstream node (taking an SW_2 as an example) through an MSTP port, where the region join packet carries the region information of the MSTP.

For example, as shown in FIG. 2, after the root bridge SW_1 sends the region join packet through an MSTP port, the region join packet will reach the SW_2.

Step 43: The SW_2 reports the received region join packet to a central processing unit (CPU) of the SW_2 itself, and refreshes region information configured on the SW_2 itself with the region information of the MSTP that is carried in the region join packet.

Generally, after receiving a data packet, a switch directly forwards the packet instead of reporting the packet to its CPU. In this embodiment, however, the region join packet needs to be parsed, so as to complete region information configuration; therefore, in this embodiment, the region join packet reaches the CPU, the CPU parses the packet to acquire the region information of the MSTP, and then the region information of the MSTP is configured to region information of the switch itself. That is to say, the region information of the switch is refreshed.

Step 44: The SW_2 sends the region join packet to its downstream node (an SW_4), where the region join packet carries the region information of the MSTP.

Similar to processing on the SW_2, the SW_4 configures the region information of the MSTP that is carried in the region join packet to region information of the SW_4 itself after receiving the region join packet, so as to join a region in which the root bridge resides.

The downstream node acquires the region information of the MSTP in the region join packet and transmits the region join packet, which may realize that all bridges in a same region join the region.

In this embodiment, a root bridge sends a region join packet to a downstream bridge, where the region join packet carries region information, so that automatic region information configuration can be implemented and the downstream bridge automatically joins a corresponding region by acquiring region information of the MSTP in the region join packet. In addition, by continuing to send the region join packet to a downstream node, all bridges in a same region may join the region, thereby avoiding an issue about a large workload, difficult deployment, and high operation and maintenance costs involved in manual configuration.

Figure 5:
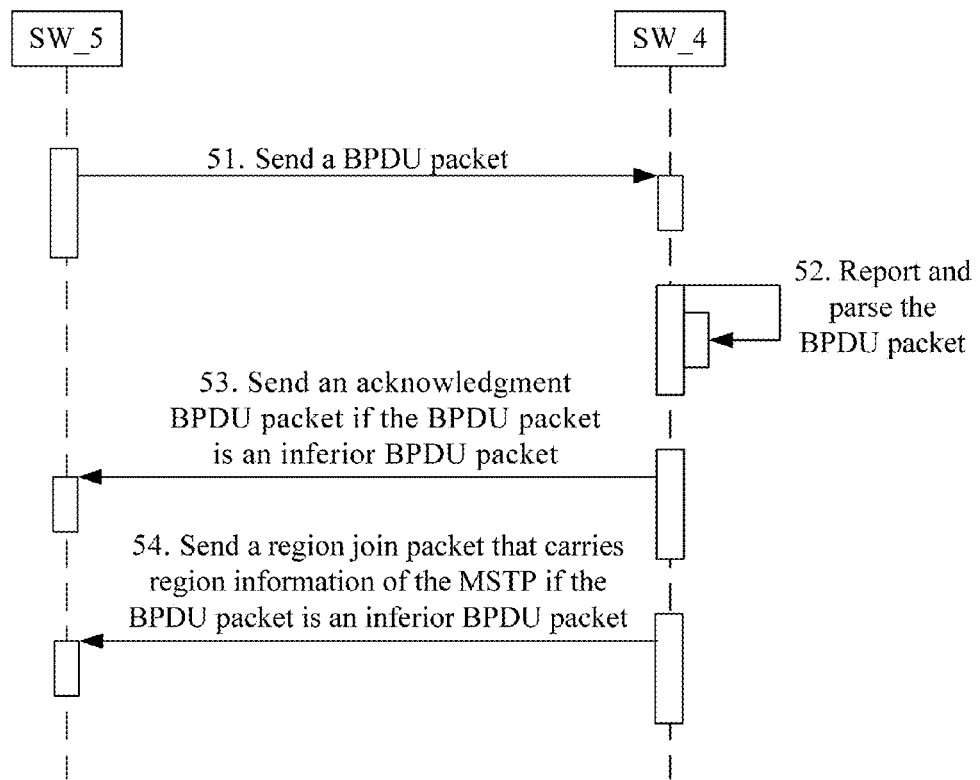
FIG. 5 is a schematic flowchart of a method according to a fourth embodiment of the present invention.

FIG. 5 is a schematic flowchart of a method according to a fourth embodiment of the present invention. In this embodiment, join of a new switch is taken as an example. Refer to FIG. 5. This embodiment includes the following steps:

Step 51: A switch SW_5 to join sends a BPDU packet to an upstream node SW_4 connected to the switch SW_5 itself.

Refer to FIG. 2. It is assumed that a switch to join is the SW_5 (not indicated in the figure) and the SW_5 is connected to the SW_4. Then the SW_5 sends the BPDU packet to the SW_4, where the BPDU packet carries a bridge ID of the SW_5.

Step 52: The upstream node SW_4 reports and parses the BPDU packet.

For example, in a reporting and parsing process, the BPDU packet is reported by a forwarding module to a CPU for the CPU to perform parsing. The bridge ID of the SW_5 may be acquired through parsing. If a priority in the bridge ID is lower than a priority of the SW_4, it indicates that the SW_5 is a downstream node of the SW_4. In this case, the BPDU packet sent by the SW_5 is an inferior BPDU packet, that is, a BPDU packet with a lower priority. In other words, a BPDU packet sent by a downstream node to an upstream node is called an inferior BPDU packet. If the value of a priority in a bridge ID is large, it indicates that a priority of a corresponding switch is low.

Step 53: When determining that the BPDU packet is an inferior BPDU packet, the SW_4 sends an acknowledgment BPDU packet to the SW_5.

Step 54: When determining that the BPDU packet is an inferior BPDU packet, the SW_4 sends a region join packet to the SW_5, where the region join packet carries region information of the MSTP.

The SW_5 may configure the region information of the MSTP to region information of the SW_5 itself after receiving the region join packet.

In this embodiment, a root bridge sends a region join packet that carries region information to a switch to join, and the switch to join parses the packet and uses the region information carried in the region join packet about a region in which the root bridge resides as region information of the switch itself, so that the switch to join also joins the region in which the root bridge resides.

Figure 6:
FIG. 6 is a schematic structural diagram of a switch according to a fifth embodiment of the present invention.

FIG. 6 is a schematic structural diagram of a switch according to a fifth embodiment of the present invention. The switch may be a root bridge of an MSTI to be generated. The switch includes an acquiring module 61 and a sender 62, where the acquiring module 61 is adapted to acquire region information of the MSTP; and the sender 62 is adapted to send a region join packet to a downstream bridge after the region information of the MSTP is configured on the switch, where the region join packet carries the region information of the MSTP, so that the downstream bridge configures the region information of the MSTP to region information of the downstream bridge.

The acquiring module may be specifically adapted to receive region information of the MSTP that is entered by a user by using a command line. After the switch receives the region information of the MSTP that is entered by the user by using the command line, configuration of the region information of the MSTP is completed on the switch.

In this embodiment, a root bridge sends a region join packet to a downstream bridge, where the region join packet carries region information, so that the downstream bridge implements automatic region information configuration and automatically joins a corresponding region.

Figure 7:
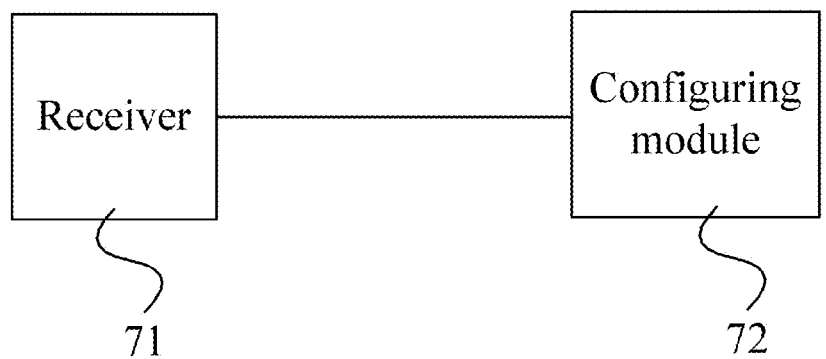
FIG. 7 is a schematic structural diagram of a switch according to a sixth embodiment of the present invention.

FIG. 7 is a schematic structural diagram of a switch according to a sixth embodiment of the present invention. The switch is a downstream bridge of an MSTI to be generated on an MSTP network. The switch includes a receiver 71 and a configuring module 72. The receiver 71 is adapted to receive a region join packet sent by an upstream node, where the region join packet carries region information of the MSTP; and the configuring module 72 is adapted to configure the region information of the MSTP to local region information.

The configuring module may be specifically adapted to configure the region information of the MSTP to the local region information after the region join packet is received; or compare a region name in the region information of the MSTP with a region name configured on the switch itself after the region join packet is received, and, if the two are the same, configure the region information of the MSTP to the local region information.

Further, the switch may further include a sender, adapted to send the region join packet that carries the region information of the MSTP to a downstream node when the downstream node exists, so that the downstream node configures the region information of the MSTP to region information of the downstream node itself.

In this embodiment, automatic region information configuration can be implemented by receiving a region join packet sent by a root bridge, where the region join packet carries region information, and automatic join to a corresponding region is completed after the region information is automatically configured.

Figure 8:
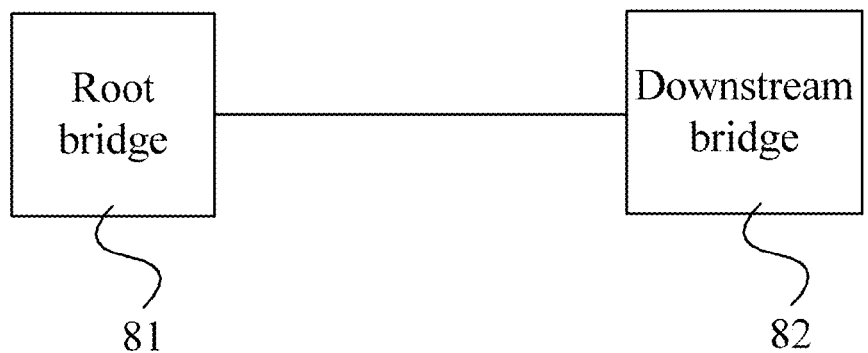
FIG. 8 is a schematic structural diagram of a network system according to a seventh embodiment of the present invention.

FIG. 8 is a schematic structural diagram of a network system according to a seventh embodiment of the present invention. The system includes a root bridge 81 and a downstream bridge 82, where the root bridge 81 is adapted to send configured region information of the MSTP to the downstream bridge 82, and the downstream bridge 82 is adapted to configure the region information of the MSTP to region information of the downstream bridge 82.

The root bridge may be specifically as shown in FIG. 6, and the downstream bridge may be specifically as shown in FIG. 7.

In addition, multiple downstream bridges may exist, and a downstream bridge may further send a region join packet to its downstream bridge.

In this embodiment, a root bridge sends a region join packet to a downstream bridge, where the region join packet carries region information, so that the downstream bridge implements automatic region information configuration and the downstream bridge automatically joins a corresponding region after the region information is automatically configured.

It should be understood that, related features in the foregoing methods and devices may be referenced mutually. In addition, "first" and "second" in the foregoing embodiments are used to distinguish embodiments, but do not represent superiority or inferiority of all embodiments.

Persons of ordinary skill in the art should understand that all or a part of the steps in the method embodiments may be implemented by a program instructing relevant hardware. The program may be stored in a computer readable storage medium. When the program is run, the steps in the method embodiments are performed. The storage medium may be any medium that is capable of storing program codes, such as a read only memory (ROM), a random access memory (RAM), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof as long as such modifications or replacements do not cause the essence of corresponding technical solutions to depart from the spirit and scope of the technical solutions of the embodiments of the present invention.

What is claimed is:

1. A method for making bridges join one Multiple Spanning Tree Protocol (MSTP) region during the MSTP region network topology establishment, comprising: receiving, by a downstream bridge, a region join packet sent by an upstream node, wherein the region join packet carries region information of the MSTP region, wherein the region information of the MSTP region comprises a triplet comprising a region name, an instance, and a revision level, wherein the region name indicates a name of the MSTP region, and wherein the instance indicates multiple spanning tree instances (MSTIs) in the MSTP region and a virtual local area network (VLAN) list corresponding to each MSTI; comparing, by the downstream bridge, the region name in the region information of the MSTP region with a region name configured on the downstream bridge; and configuring, by the downstream bridge, the region information of the MSTP region to the region information of the downstream bridge to join the MSTP region and generate the multiple MSTIs in the MSTP region when the comparison result indicates that the region name in the region information of the MSTP region is the same as the region name configured on the downstream bridge.

2. The method according to claim 1, further comprising sending the region join packet that carries the region information of the MSTP region to a downstream node of the downstream bridge so that the downstream node configures the region information of the MSTP region to its region information to join the MSTP region and generate the multiple MSTIs in the MSTP region.

3. The method according to claim 1, wherein prior to receiving the region join packet, the region information of the MSTP region is acquired by a root bridge, and wherein the root bridge comprises a switch having a bridge ID with highest priority in the MSTP region.

4. A switch that joins one Multiple Spanning Tree Protocol (MSTP) region during the MSTP region network topology establishment, comprising a computing hardware executing a program stored in a non-transitory computer-readable storage medium and configured to: receive a region join packet sent by an upstream node, wherein the region join packet carries region information of the MSTP region, wherein the region information of the MSTP region comprises a triplet comprising a region name, an instance and a revision level, wherein the region name indicates a name of the MSTP region, and wherein the instance indicates multiple spanning tree instances (MSTIs) in the MSTP region and a virtual local area network (VLAN) list corresponding to each MSTI; compare the region name in the region information of the MSTP region with a region name configured on the switch; and configure the region information of the MSTP to the region information of the switch to join the MSTP region and generate the multiple MSTIs in the MSTP region when the comparison result indicates that the region name in the region information of the MSTP region is the same as the region name configured on the switch.

5. The switch according to claim 4, wherein the computing hardware is further configured to send the region join packet that carries the region information of the MSTP to a downstream node of the downstream bridge so that the downstream node configures the region information of the MSTP region to its region information to join the MSTP region and generate the multiple MSTIs in the MSTP region.

6. The switch according to claim 4, wherein the region information of the MSTP region is acquired by a root bridge, and wherein the root bridge comprises a switch having a bridge ID with highest priority in the MSTP region.

7. A network system, comprising: a downstream bridge; and a root bridge, wherein the root bridge comprises a switch having a bridge ID with highest priority in a Multiple Spanning Tree Protocol (MSTP) region, and during the MSTP region network topology establishment, wherein the root bridge is adapted to acquire region information of the MSTP region and send a region join packet to the downstream bridge, wherein the region join packet carries the region information of the MSTP region, wherein the region information of the MSTP region comprises a triplet comprising a region name, an instance and a revision level, wherein the region name indicates a name of the MSTP region, wherein the instance indicates multiple spanning tree instances (MSTIs) in the MSTP region and a virtual local area network (VLAN) list corresponding to each MSTI, and wherein the downstream bridge is adapted to compare the region name in the region information of the MSTP region with a region name configured on the downstream bridge, and configure the region information of the MSTP region to the region information of the downstream bridge to join the MSTP region and generate the multiple MSTIs in the MSTP region when the region name in the region information of the MSTP region is the same as the region name configured on the downstream bridge.

8. The system according to claim 7, further comprising a downstream node of the downstream bridge, wherein the downstream bridge is further adapted to send the region join packet that carries the region information of the MSTP region to the downstream node so that the downstream node configures the region information of the MSTP region to its region information, and the downstream bridge and the downstream node level by level join the MSTP region and generate the multiple MSTIs in the MSTP region.

\* \* \* \* \*

UNITED STATES PATENT AND TRADEMARK OFFICE
CERTIFICATE OF CORRECTION

| | | |
|---|---|---|
| PATENT NO. | : 9,264,314 B2 | Page 1 of 1 |
| APPLICATION NO. | : 14/175245 | |
| DATED | : February 16, 2016 | |
| INVENTOR(S) | : Jianbing Huang | |

It is certified that error appears in the above-identified patent and that said Letters Patent is hereby corrected as shown below:

On the title page item [30] should read:

Aug. 9, 2011 (CN) ..................... 201110226870.7

Signed and Sealed this
Third Day of May, 2016

Michelle K. Lee
*Director of the United States Patent and Trademark Office*